(12) United States Patent
Katoh et al.

(10) Patent No.: US 10,988,063 B2
(45) Date of Patent: Apr. 27, 2021

(54) SEAT FOR VEHICLE

(71) Applicant: TOYOTA JIDOSHA KABUSHIKI KAISHA, Toyota (JP)

(72) Inventors: Kohshi Katoh, Hadano (JP); Norihisa Aoki, Toyota (JP); Kohei Yasuda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/277,277

(22) Filed: Feb. 15, 2019

(65) Prior Publication Data

US 2019/0255976 A1    Aug. 22, 2019

(30) Foreign Application Priority Data

Feb. 22, 2018    (JP) .............................. JP2018-029848

(51) Int. Cl.
| | | |
|---|---|---|
| *B60N 2/02* | (2006.01) | |
| *B60N 2/54* | (2006.01) | |
| *B60N 2/68* | (2006.01) | |
| *B60N 2/50* | (2006.01) | |
| *B60N 2/70* | (2006.01) | |
| *B60N 2/72* | (2006.01) | |

(52) U.S. Cl.
CPC ............. *B60N 2/546* (2013.01); *B60N 2/503* (2013.01); *B60N 2/544* (2013.01); *B60N 2/68* (2013.01); *B60N 2/7094* (2013.01); *B60N 2/72* (2013.01)

(58) Field of Classification Search
CPC ........ B60N 2/546; B60N 2/503; B60N 2/544; B60N 2/68; B60N 2/7094; B60N 2/72
See application file for complete search history.

(56) References Cited

U.S. PATENT DOCUMENTS

| | | | | |
|---|---|---|---|---|
| 6,811,227 B2 * | 11/2004 | Andersson | ............. | B60N 2/502 |
| | | | | 297/216.1 |
| 7,416,256 B2 * | 8/2008 | Fujita | ..................... | B60N 2/502 |
| | | | | 297/216.1 |
| 8,287,039 B2 * | 10/2012 | Akutsu | ................ | B60N 2/7094 |
| | | | | 297/216.12 |

(Continued)

FOREIGN PATENT DOCUMENTS

| | | | |
|---|---|---|---|
| CN | 105313735 A | | 2/2016 |
| JP | 2014-213741 A | | 11/2014 |

(Continued)

*Primary Examiner* — Syed A Islam
(74) *Attorney, Agent, or Firm* — Oliff PLC (57) ABSTRACT

A seat for a vehicle includes a seat back frame, a first elastic member, and a second elastic member. The seat back frame includes a main frame and a sub-frame. The first elastic member and the second elastic member are configured to support the sub-frame such that the sub-frame is rotatable in a width direction of the seat and are mounted between the main frame and upper end portions of the sub-frame on both sides in the width direction of the seat. Each of the first elastic member and the second elastic member has a limit of elongation and has a characteristic in which a load that is applied to the sub-frame in a rear direction of the seat acts as tension to generate a reaction force due to the limit of elongation and does not generate the reaction force in the width direction of the seat.

7 Claims, 4 Drawing Sheets

(56) References Cited

U.S. PATENT DOCUMENTS

| | | | |
|---|---|---|---|
| 8,491,040 B2* | 7/2013 | Baumann | B62D 31/003 |
| | | | 296/187.12 |
| 9,283,868 B2* | 3/2016 | Sugiyama | B60N 2/02 |
| 9,738,194 B2* | 8/2017 | Hoshi | B60N 2/68 |
| 9,950,646 B2 | 4/2018 | Katoh et al. | |
| 10,166,888 B2* | 1/2019 | Sugiyama | B60N 2/2222 |
| 10,173,552 B2* | 1/2019 | Sugiyama | B60N 2/39 |
| 10,239,421 B2* | 3/2019 | Katoh | B60N 2/7094 |
| 10,377,275 B2* | 8/2019 | Ketels | B60N 2/7094 |
| 10,493,878 B2* | 12/2019 | Ketels | B60N 2/504 |
| 10,682,938 B2* | 6/2020 | Katoh | B60N 2/028 |
| 2014/0191550 A1 | 7/2014 | Katoh et al. | |
| 2015/0239381 A1 | 8/2015 | Hamabe et al. | |
| 2015/0367756 A1 | 12/2015 | Katoh et al. | |
| 2016/0221481 A1* | 8/2016 | Sugiyama | B60N 2/4228 |
| 2018/0072187 A1 | 3/2018 | Katoh et al. | |

FOREIGN PATENT DOCUMENTS

| | | |
|---|---|---|
| JP | 2015-160457 A | 9/2015 |
| JP | 2016-005938 A | 1/2016 |
| JP | 2018-043671 A | 3/2018 |
| WO | 2013/021497 A1 | 2/2013 |

* cited by examiner

SEAT FOR VEHICLE

The disclosure of Japanese Patent Application No. 2018-029848 filed on Feb. 22, 2018 including the specification, drawings and abstract is incorporated herein by reference in its entirety.

BACKGROUND

1. Technical Field

The disclosure relates to a seat for a vehicle, in which a part of a seat back supporting a back portion of an occupant moves with respect to a seat back frame, for example, when the vehicle turns or when a vehicle body bumps on an uneven road or the like.

2. Description of Related Art

As an example of a seat for a vehicle of the related field, a seat for a vehicle in which it is possible to improve steering operability or posture retainability of an occupant by moving a backrest part that is a part of a seat back in accordance with natural movement of the occupant's body during turning of the vehicle or the like has been proposed (refer to, for example, WO 2013/021497 and Japanese Unexamined Patent Application Publication No. 2016-005938 (JP 2016-005938 A)).

The seat for a vehicle disclosed in JP 2016-005938 A is provided with a suspending part that suspends a backrest part disposed forward of a seat back frame in the vehicle front-rear direction from above the seat back frame. The suspending part has a warp yarn portion and a weft yarn portion and suspends the backrest part so as to be rotatable in the seat width direction with respect to the seat back frame. The warp yarn portion and the weft yarn portion are formed of wire members having flexibility and stretchability. Further, the backrest part is connected to the seat back frame through wires respectively provided at three positions, that is, both ends in the seat width direction at an upper end portion of the backrest part and a central portion in the seat width direction at a lower end portion of the backrest part, or at four position, that is, both ends in the seat width direction at the upper end portion of the backrest part and both right and left ends in the seat width direction at the lower end portion of the backrest part. Each of the wires is mounted such that a longitudinal direction thereof is along a front-rear direction of the vehicle, and allows the backrest part to rotate in the seat width direction around a position facing the height of the thoracic vertebrae of the seated person within a bending range. Here, bending means deformation in which an axis in the longitudinal direction bends within an elastic limit.

Further, in order to improve steering operability, a vehicle seat in which a net is stretched in a seat back frame is known (refer to, for example, Japanese Unexamined Patent Application Publication No. 2015-160457 (JP 2015-160457 A)). In the vehicle seat disclosed in JP 2015-160457 A, the seat back frame is formed in the form of a frame and the net is stretched radially from substantially the center of the inside of the seat back frame.

SUMMARY

The wire described in JP 2016-005938 A determines a position in the front-rear direction of the seat while allowing the rotation of the backrest part in the seat width direction. Since such a wire is easy to bend, it is easy to create a hanged state of the backrest part, whereas in a case where the wire has a characteristic in which the wire is soft in a bending direction, the wire moves at the time of seating, so that posture retainability becomes poor. Conversely, when the diameter is made thick to have a characteristic in which it is not easily bent, there is a possibility that a problem in which the rotation of the backrest part is hindered may arise.

The disclosure provides a seat for a vehicle, in which it is possible to restrict the movement of a sub-frame so as to facilitate seating, without hindering the rotation of the sub-frame in a seat width direction.

A first aspect of the disclosure relates to a seat for a vehicle. The seat includes a seat back frame configured to support a back of a seated person, a first elastic member, and a second elastic member. The seat back frame includes a main frame and a sub-frame that is disposed in front of the main frame in a front-rear direction of the seat, and is configured such that the sub-frame is suspended from the main frame by a support member. The first elastic member and the second elastic member are configured to support the sub-frame such that the sub-frame is rotatable in a width direction of the seat and are mounted between the main frame and upper end portions of the sub-frame on both sides in the width direction of the seat. Each of the first elastic member and the second elastic member has a limit of elongation and has a characteristic in which a load that is applied to the sub-frame in a rear direction of the seat acts as tension to generate a reaction force due to the limit of elongation and does not generate the reaction force in the width direction of the seat.

In the seat according to the first aspect, at least one of the first elastic member and the second elastic member may be a leaf spring. A first end portion on the front side of the first elastic member in the front-rear direction of the seat may be fixed to a fixing plate extending forward or rearward in the front-rear direction of the seat from the main frame, and a second end portion on the rear side of the first elastic member in the front-rear direction of the seat may be fixed to the sub-frame. Further, a third end portion on the front side of the second elastic member in the front-rear direction of the seat may be fixed to a fixing plate extending forward or rearward in the front-rear direction of the seat from the main frame, and a fourth end portion on the rear side of the second elastic member in the front-rear direction of the seat may be fixed to the sub-frame. In the seat according to the first aspect, a second end portion on the rear side of the first elastic member in the front-rear direction of the seat may be fixed to a fixing plate extending forward or rearward in the front-rear direction of the seat from the main frame, and a first end portion on the front side of the first elastic member in the front-rear direction of the seat may be fixed to the sub-frame.

The seat according to the first aspect may further include a third elastic member disposed between the main frame and a lower end portion of the sub-frame, the lower end portion being located further toward the lower side of the seat than the upper end portion, and the third elastic member may have a characteristic in which the third elastic member is more easily extended in the front-rear direction of the seat than the first elastic member and the second elastic member.

With the seat according to the aspects of the disclosure, each of the first elastic member and the second elastic member has a limit of elongation and is mounted in a form in which a load that is applied to the sub-frame in the rear direction of the seat acts as tension to generate a reaction force due to the limit of elongation and does not generate the reaction force in the width direction of the seat. For this reason, the first elastic member and the second elastic member do not generate an elastic force in a fully extended state and solely the tensile strength of a material acts as a stress. Therefore, a very large reaction force can be generated. Accordingly, in a case where the first elastic member and the second elastic member are made of, for example, leaf springs, even though the thickness is thin, the first elastic member and the second elastic member can sufficiently withstand a load that is applied in the rear direction of the seat. Accordingly, it is possible to reduce a spring coefficient for allowing the rotation of the sub-frame in the seat width direction. For this reason, it is possible to restrict the movement of the sub-frame so as to facilitate seating, without hindering the rotation of the sub-frame in the seat width direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
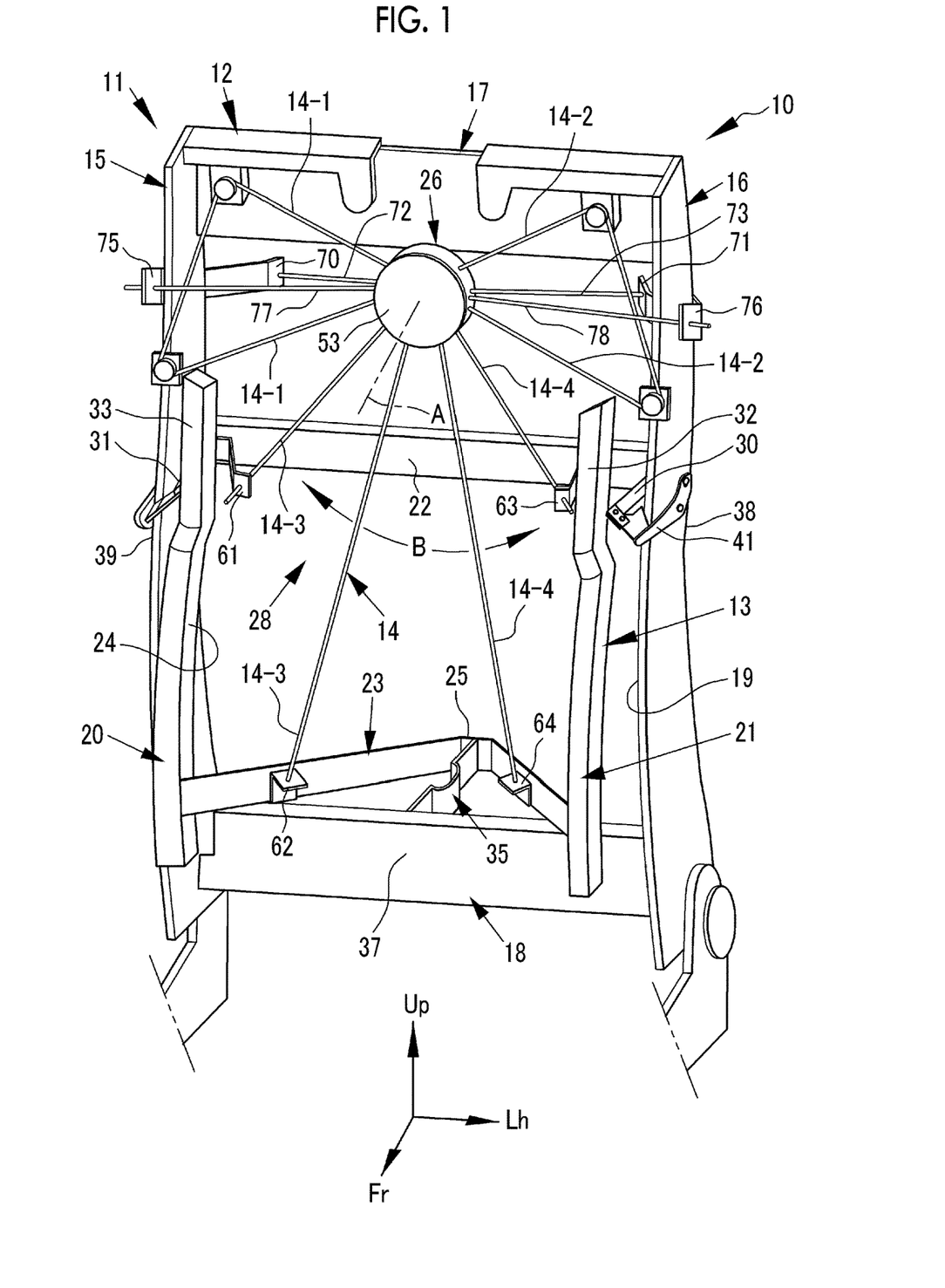
FIG. 1 is a perspective view showing an example of a seat for a vehicle that is an embodiment of the disclosure.

FIG. 1 shows an example of a seat for a vehicle (hereinafter referred to as a "seat") 10 that is an embodiment of the disclosure. The seat 10 is a so-called one-person seat and is used as, for example, a driver seat or a passenger seat in a vehicle. A direction of an arrow Fr shown in the drawings to be described below represents a front direction in a front-rear direction of the seat 10, a direction of an arrow Lh represents a left direction in a width direction of the seat 10, a direction of an arrow Rh represents a right direction in the width direction of the seat 10, and a direction of an arrow Up represents an upward direction in a height direction of the seat 10. The front-rear direction of the seat 10 coincides with a front-rear direction of the vehicle, the width direction of the seat coincides with a vehicle width direction, and the height direction of the seat coincides with a height direction of the vehicle.

As shown in FIG. 1, the seat 10 has a seat back frame 11 that supports the back of a seated person. The seat back frame 11 is provided with a main frame 12, a sub-frame 13, and a plurality of wire materials 14.

The main frame 12 is formed by connecting a first right side member 15, a first left side member 16, a first upper member 17, and a first lower member 18 in a rectangular shape, for example, and has a first opening 19 in the interior of the rectangular shape.

The sub-frame 13 is formed by connecting a second right side member 20, a second left side member 21, a second upper member 22, and a second lower member 23 in a frame shape, and has a second opening 24 in the interior of the frame shape. The second lower member 23 may have, for example, a V-shape in which a first central portion 25 in the width direction of the seat 10 is further recessed rearward in the front-rear direction of the seat 10 than both ends.

The sub-frame 13 is disposed in front of the main frame 12 in the front-rear direction of the seat 10 and is suspended from the main frame 12 by the wire materials 14. Specifically, the sub-frame 13 is suspended from the main frame 12 through a connection tool 26. The sub-frame 13 supports the rear surface extending from a waist portion to a shoulder blade portion or a shoulder portion of the seated person. Each of the wire materials 14 is an example of a support member. As the support member, instead of the wire material 14, a narrow belt having elasticity may be used.

Each of the wire materials 14 is formed of a material having elasticity in a longitudinal direction and configures a part of a net 28 for imparting holding properties and cushioning properties by being bent when an occupant leans against it. The net 28 includes a first wire material 14-1, a second wire material 14-2, a third wire material 14-3, a fourth wire material 14-4, and the connection tool 26. The first wire material 14-1 is connected between the main frame 12 and the connection tool 26 in the range on the upper side in the height direction of the seat 10 and the right side in the width direction of the seat 10. The second wire material 14-2 is connected between the main frame 12 and the connection tool 26 in the range on the upper side in the height direction of the seat 10 and the left side in the width direction of the seat 10. The third wire material 14-3 is connected between the connection tool 26 and the sub-frame 13 in the range on the lower side in the height direction of the seat 10 and the right side in the width direction of the seat 10. The fourth wire material 14-4 is connected between the connection tool 26 and the sub-frame 13 in the range on the lower side in the height direction of the seat 10 and the left side in the width direction of the seat 10. The net 28 may be provided with a cover member made of resin, which covers the wire materials 14.

The first wire material 14-1 to the fourth wire material 14-4 are radially stretched in the interior of the first opening 19. The connection tool 26 is disposed at a position that is the center in a radial arrangement, and has, for example, a circular outer shape when viewed from the front, and binds the first wire material 14-1 to the fourth wire material 14-4. The first wire material 14-1 to the fourth wire material 14-4 are laid radially from the outer periphery of the connection tool 26 toward the main frame 12 and the sub-frame 13. The position of the connection tool 26 is at least the center in the width direction of the seat 10. The position of the connection tool 26 in the height direction of the seat 10 may be closer to the upper side than the center in the main frame 12.

When the seated person leans against the net 28, the connection tool 26 faces, for example, the area between the shoulder blades. When the vehicle rolls with respect to the axis in the front-rear direction during steering or turning, the waist of the driver is pushed in a centrifugal direction according to the rolling, and therefore, the upper body is rotated around the area between the shoulder blades in the direction against the centrifugal direction. That is, due to the rotation of the upper body, the wire materials 14 are deformed in a circumferential direction around the connection tool 26. A steering operation of the driver is facilitated due to an elastic force by which the wire material 14 tries to return to the original state against the deformation. Further, the movement of the head of a passenger sitting on a seat other than the driver's seat is reduced due to the abovementioned elastic force during turning and the passenger can take a posture that is superior in posture retainability during turning.

A first elastic member 30 and a second elastic member 31 are mounted between the sub-frame 13 and the main frame 12. The first elastic member 30 and the second elastic member 31 are disposed between the main frames 12 and upper end portions 32, 33 on both sides in the width direction of the seat 10 in the sub-frame 13. Specifically, the first elastic member 30 is connected between the first upper end portion 32 that is located on the upper side in the height direction of the seat 10 in the second left side member 21, and a first mounting portion 38 that is located at the center in the height direction of the seat 10 in the first left side member 16 or further toward the upper side than the center (in this specification, the "center" is a meaning including "substantially the center"). The second elastic member 31 is connected between the second upper end portion 33 that is located on the upper side in the height direction of the seat 10 in the second right side member 20, and a second mounting portion 39 that is located at the center in the height direction of the seat 10 in the first right side member 15 or further toward the upper side than the center. The first upper end portion 32 and the second upper end portion 33 are examples of upper end portions on both sides.

The first elastic member 30 may be a leaf spring in the form of a flat plate. The first elastic member 30 has a spring property in a rotation direction (a direction of an arrow B shown in the same drawing) around an axis A passing through the connection tool 26 and extending in the front-rear direction of the seat 10. The second elastic member 31 may be a leaf spring having the same shape as the first elastic member 30 and is elastically deformed in the rotation direction B.

A third elastic member 35 is mounted between the sub-frame 13 and the main frame 12 further on the lower side than the mounting positions of the first elastic member 30 and the second elastic member 31 in the height direction of the seat 10. The third elastic member 35 is disposed between the main frame 12 and a lower end portion of the sub-frame 13, which is located further toward the lower side than the upper end portions 32, 33 of the sub-frame 13 in the height direction of the seat 10. Specifically, the third elastic member 35 is disposed, for example, between the first central portion 25 of the second lower member 23 and a second central portion 37 that is the center in the width direction of the seat 10, of the first lower member 18. The third elastic member 35 holds and restrains the first central portion 25 and the second central portion 37 in a predetermined range in the front-rear direction of the seat 10 and receives a load acting in the front-rear direction of the seat 10. The predetermined range is a range from a length (elastic limit length) in which the third elastic member 35 extends maximally in the front-rear direction of the seat 10 when a load acts in the front-rear direction of the seat 10, to a length at the time when the third elastic member 35 has returned to the original position. The third elastic member 35 has a spring property in the rotation direction B around the axis A and absorbs shock energy by being elastically deformed by receiving a compressive load when receiving a load that is generated in the front-rear direction of the seat 10.

The shape, the material, the mounting position, and the like of each of the first elastic member 30, the second elastic member 31, and the third elastic member 35 are set such that each of the first elastic member 30, the second elastic member 31, and the third elastic member 35 is bent in the rotation direction B by a predetermined amount determined in advance when each of the first elastic member 30, the second elastic member 31, and the third elastic member 35 receives rotational torque exceeding the rotational torque determined in advance from the outside. The rotational torque referred to here is represented by the product of a force that includes the weight of the seated person, a moving force of the seated person, an inertial force due to acceleration acting during the turning of the vehicle, and the like, and a distance from the connection tool 26 to a position where the force acts. Further, the first elastic member 30, the second elastic member 31, and the third elastic member 35 have centering functions of automatically returning the sub-frame 13 to a position where the rotation force acting in the rotation direction B in the main frame 12 is balanced with the reaction force thereof.

The sub-frame 13 rotates in the rotation direction B with respect to the main frame 12 due to elastic deformation of the first elastic member 30, the second elastic member 31, and the third elastic member 35. For this reason, in a case where the vehicle rolls when the vehicle turns or during steering, the sub-frame 13 acts to assist in, for example, the movement of the head, shoulder, and waist of the seated person in a direction opposite to a rolling direction so as to resist the rolling.

The number of the first elastic members 30 is not limited to one, and a plurality of first elastic members may be provided. In this case, the first elastic members may be disposed such that the sub-frame 13 is deflected in the rotation direction B. The second elastic member 31 may be disposed in the manner that is the same as or similar to that in the first elastic member 30 described above. Further, the first elastic member 30 and the second elastic member 31 are not limited to leaf springs, and as long as it is an elastic member in which the above-described action and effect can be obtained, any elastic member may be used. Further, the mounting positions and the mounting postures of the first elastic member 30 and the second elastic member 31 are not limited to those in the embodiment described above, and as long as the above-described action and effect can be obtained, any form may be adopted. For example, the first elastic member 30 is configured of a single leaf spring. However, a form in which a plurality of leaf springs is stacked may be adopted. In this case, it is favorable that the second elastic member 31 has a configuration that is the same as or similar to that of the first elastic member 30. Further, the leaf spring is not limited to a flat plate, and for example, a plate having a shape bent in an arc shape may be used.

Figure 2:
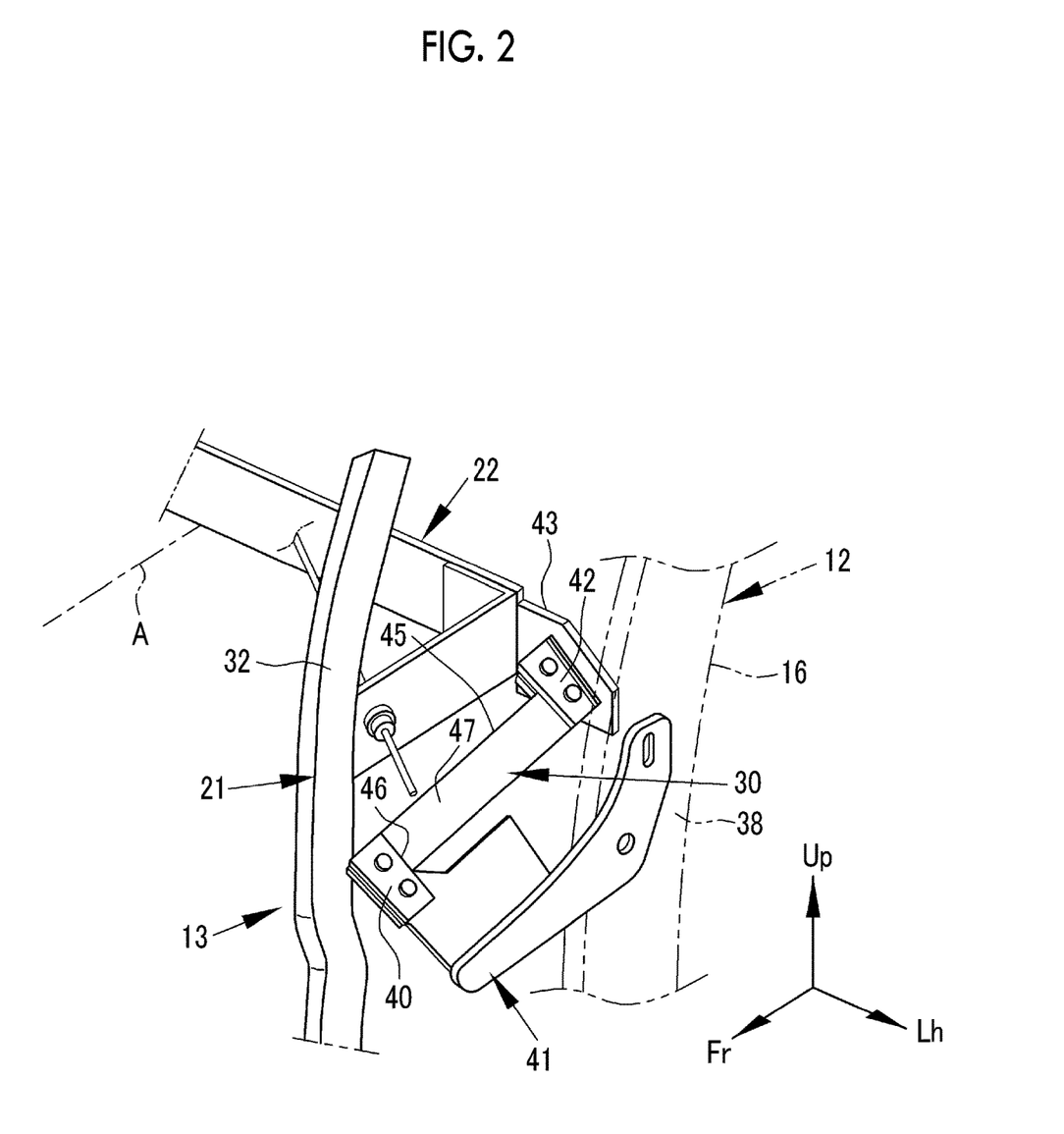
FIG. 2 is a perspective view showing a first elastic member shown in FIG. 1.

FIG. 2 is a perspective view showing the first elastic member shown in FIG. 1. As shown in FIG. 2, a first end portion 40 on the front side in the front-rear direction of the seat 10, of the first elastic member 30, is fixed to a fixing plate 41 extending forward of the seat 10 from the main frame 12. Further, a second end portion 42 on the rear side in the front-rear direction of the seat 10, of the first elastic member 30, is fixed to a left end portion 43 that is located on the left side in the width direction of the seat 10 in the sub-frame 13, for example, the second upper member 22. The first elastic member 30 is, for example, a metallic leaf spring in the form of a thin flat plate having a laterally elongated flat surface 47 surrounded by long sides 45 and short sides 46, and is mounted in such a posture that the long sides 45 extend along the front-rear direction of the seat 10 (in this specification, the "front-rear direction of the seat 10" is a meaning including a "substantially front-rear direction of the seat 10").

For this reason, tension is applied to the first elastic member 30 in a pulling direction due to a load that is applied in the front-rear direction of the seat 10 when taking a seat. The first elastic member 30 is a thin leaf spring and has a limit to elongation in the direction of the long side 45. Accordingly, in the fully extended state of the first elastic member 30, an elastic force is not generated and the first elastic member 30 can cause a stress based on the characteristic of a material, such as the tensile strength or Young's modulus of the material, to act on the sub-frame 13. Therefore, it is possible to generate a very large reaction force in the front direction in the front-rear direction of the seat. Therefore, the first elastic member 30 has a characteristic in which the Young's modulus is much larger than a spring coefficient. For this reason, even though the plate thickness of the first elastic member 30 is made thin, the first elastic member 30 can support a load that is applied in the rear direction in the front-rear direction of the seat 10. Further, the first elastic member 30 has a characteristic in which the spring coefficient is reduced by reducing the plate thickness. For this reason, the first elastic member 30 does not hinder the rotation of the sub-frame 13.

The second elastic member 31 has the same configuration as that of the first elastic member 30 and is mounted so as to have a shape that is line-symmetrical with respect to the first elastic member 30 with the line passing through the center in the width direction of the seat 10 as an axis. For this reason, detailed description here will be omitted. In order to facilitate the rotation of the sub-frame 13, the first elastic member 30 and the second elastic member 31 may be mounted such that the surfaces of the first elastic member 30 and the second elastic member 31 face toward the inside or the inner lower side of the seat 10 when viewed from the front of the seat such that the sub-frame 13 can swing.

Further, a configuration may be made such that the distance between the first end portion 40 on the front side of the first elastic member 30 and a third end portion 50 (refer to FIG. 3) on the front side of the second elastic member 31 is wider than the distance between the second end portion 42 on the rear side of the first elastic member 30 and a fourth end portion 51 (refer to FIG. 3) on the rear side of the second elastic member 31. According to this, the range in which the sub-frame 13 rotates in the rotation direction B may be widened. The distance is a length along the width direction of the seat 10. Further, the distance between the first end portion 40 and the third end portion 50 may be narrower than the distance between the second end portion 42 and the fourth end portion 51 such that the rotation range of the sub-frame 13 is narrowed. In this manner, the first elastic member 30 and the second elastic member 31 have predetermined characteristics and are mounted in a predetermined mounting manner, as described above, and therefore, it is possible to take the neutral point, that is, the origin position of the sub-frame 13 with the number of parts reduced as much as possible.

Figure 3:
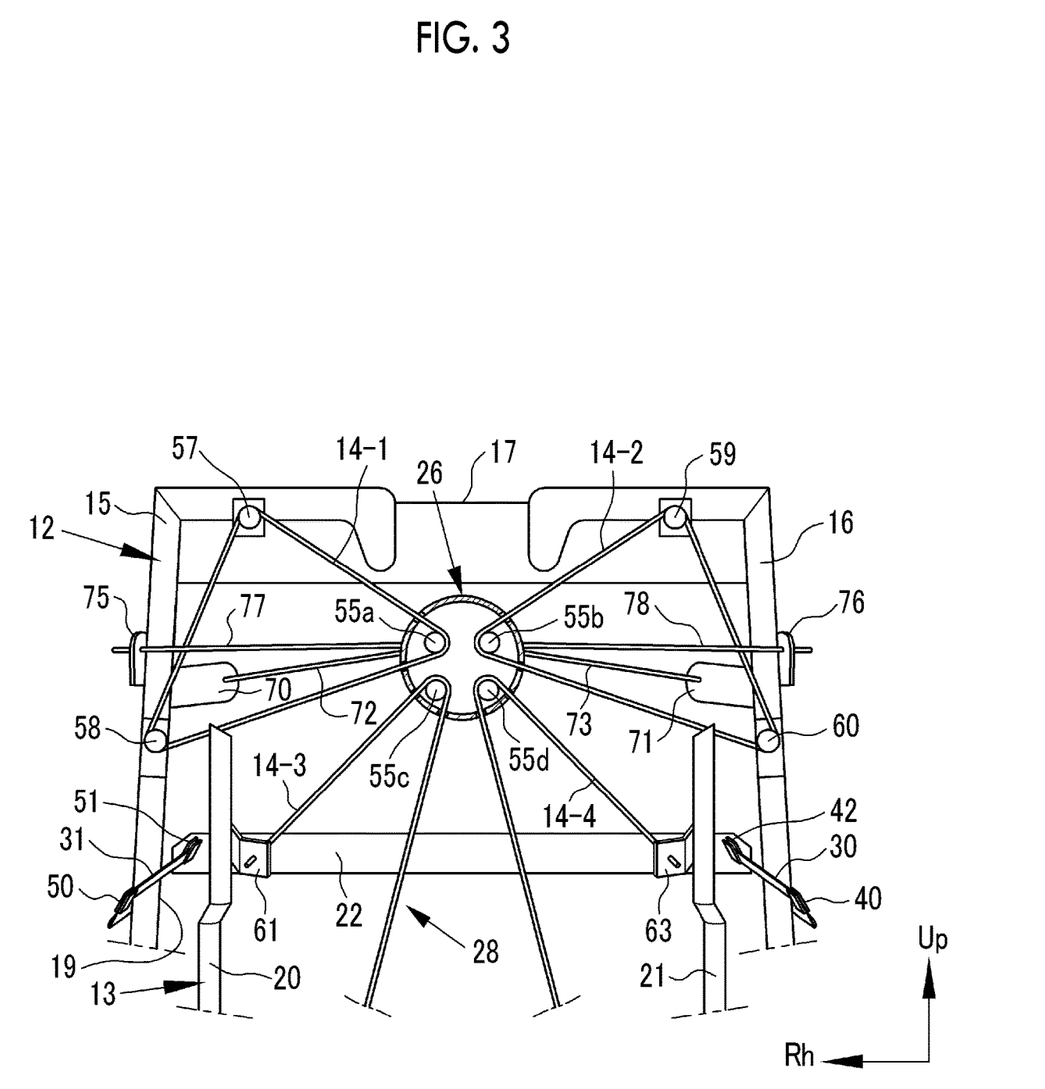
FIG. 3 is a front view showing a center portion of a seat back frame.

FIG. 3 is a front view showing the center portion of the seat back frame. In FIG. 3, a lid part 53 (refer to FIG. 1) provided on the surface of the connection tool 26 is removed to expose the interior of the connection tool 26. A plurality of guide portions 55 (55a to 55d) is provided in the interior of the connection tool 26. Each of the guide portions 55 has a columnar shape having a circular shape when viewed from the front of the seat 10, and acts as a hooking member that endlessly folds back two wire materials 14 adjacent to each other in a rotation direction around a radiant point in the wire materials 14.

In this embodiment, the first wire material 14-1 is an endless wire material and is hooked around the guide portion 55a and hooking portions 57, 58 provided at different positions of the main frame 12. The first wire material 14-1 acts to pull the connection tool 26 toward the right side in the width direction of the seat 10 and the upper side in the height direction of the seat 10. The second wire material 14-2 is an endless wire material and is endlessly hooked around the guide portion 55b and hooking portions 59, 60 provided at different positions of the main frame 12. The second wire material 14-2 acts to pull the connection tool 26 toward the left side in the width direction of the seat 10 and the upper side in the height direction of the seat 10. In this manner, the endless linear material is used, whereby a knot is eliminated, so that the strength of the net 28 is improved.

The third wire material 14-3 is an ended wire material having a first end and a second end, and the first end and the second end are fixed to fixing portions 61, 62 (refer to FIG. 1) provided at different positions of the sub-frame 13 via the guide portion 55c. The third wire material 14-3 acts to pull the connection tool 26 toward the right side in the width direction of the seat 10 and the lower side in the height direction of the seat 10. Means for fixing both ends of the third wire material 14-3 to the sub-frame 13 may be appropriately selected, such as well-known locking members.

The fourth wire material 14-4 is an ended wire material having a first end and a second end, and the first end and the second end are fixed to fixing portions 63, 64 (refer to FIG. 1) provided at different positions of the sub-frame 13 via the guide portion 55d. The fourth wire material 14-4 acts to pull the connection tool 26 toward the left side in the width direction of the seat 10 and the lower side in the height direction of the seat 10. Means for fixing both ends of the fourth wire material 14-4 to the sub-frame 13 may be appropriately selected, such as well-known locking members.

The third wire material 14-3 and the fourth wire material 14-4 act to suspend the sub-frame 13. The first wire material 14-1 to the fourth wire material 14-4 position the connection tool 26 at a predetermined position in the width direction of the seat 10 and position the connection tool 26 at a predetermined position in the height direction of the seat 10. For example, by changing the tensile forces of the third wire material 14-3 and the fourth wire material 14-4 having ends, it is possible to adjust the position of the connection tool 26 in the height direction of the seat 10 in accordance with the size. The first wire material 14-1 to the fourth wire material 14-4 are not limited to those that are mounted in the form described above, and for example, all of them may be mounted endlessly or with ends. Further, the first wire material 14-1 and the second wire material 14-2 may be mounted with ends, and the third wire material 14-3 and the fourth wire material 14-4 may be mounted endlessly.

The lid part 53 (refer to FIG. 1) configures a cover of the connection tool 26, which is mounted from the front direction in the front-rear direction of the seat 10, and restrains the wire materials 14 from coming out from the guide portions 55. For example, an ornament such as a car name or a mark indicating a brand may be written on the surface of the lid part 53.

Further, a first bracket 70 and a second bracket 71 extending rearward in the front-rear direction of the seat 10 are respectively mounted to the first right side member 15 and the first left side member 16. A first pulling rope 72 that pulls the connection tool 26 toward the rear side in the front-rear direction of the seat 10 on the right side in the width direction of the seat 10 is connected between the first bracket 70 and the connection tool 26. A second pulling rope 73 that pulls the connection tool 26 toward the rear side in the front-rear direction of the seat 10 on the left side in the width direction of the seat 10 is connected between the second bracket 71 and the connection tool 26.

Further, a third bracket 75 and a fourth bracket 76 extending forward in the front-rear direction of the seat 10 are mounted to the first right side member 15 and the first left side member 16, respectively. A third pulling rope 77 that pulls the connection tool 26 toward the front side in the front-rear direction of the seat 10 on the right side in the width direction of the seat 10 is connected between the third bracket 75 and the connection tool 26. A fourth pulling rope 78 that pulls the connection tool 26 toward the front side in the front-rear direction of the seat 10 on the left side in the width direction of the seat 10 is connected between the fourth bracket 76 and the connection tool 26.

Each of the first to fourth pulling ropes 72, 73, 77, 78 is formed of a material having the same elastic force in the longitudinal direction of the rope (in this specification, a "material having the same elastic force" is a meaning including a "material having substantially the same elastic force"). In each of the first bracket 70 and the second bracket 71, a protrusion amount (absolute value) in the front-rear direction of the seat 10 from the first opening 19 is longer than that in each of the third bracket 75 and the fourth bracket 76. That is, since the connection tool 26 is pulled toward the rear side in the front-rear direction of the seat 10 from the inside of the first opening 19 by the first bracket 70 and the second bracket 71, which have a long protruding amount, the connection tool 26 is disposed at a position closer to the rear side. For this reason, the net 28 is curved into a shape that follows the curved shape of the back face of the occupant. In order to create such a shape, for example, the first to fourth pulling ropes 72, 73, 77, 78 may be made to have a characteristic in which tensile rigidity in the longitudinal direction is higher than that of the wire material 14. The characteristic in which tensile rigidity is high indicates that deformation in a case of being pulled in the longitudinal direction is small.

The first pulling rope 72 and the third pulling rope 77 may be configured of a single rope, and the center of the rope may be folded back at a guide portion provided on the connection tool 26. Further, the second pulling rope 73 and the fourth pulling rope 78 may also be likewise configured of a single rope, and the center of the rope may be folded back at a guide portion provided on the connection tool 26. Means for fixing the end portions of the pulling ropes 72, 73, 77, 78 to the first to fourth brackets 70, 71, 75, 76, respectively, may be appropriately selected, such as well-known locking members.

Figure 4:
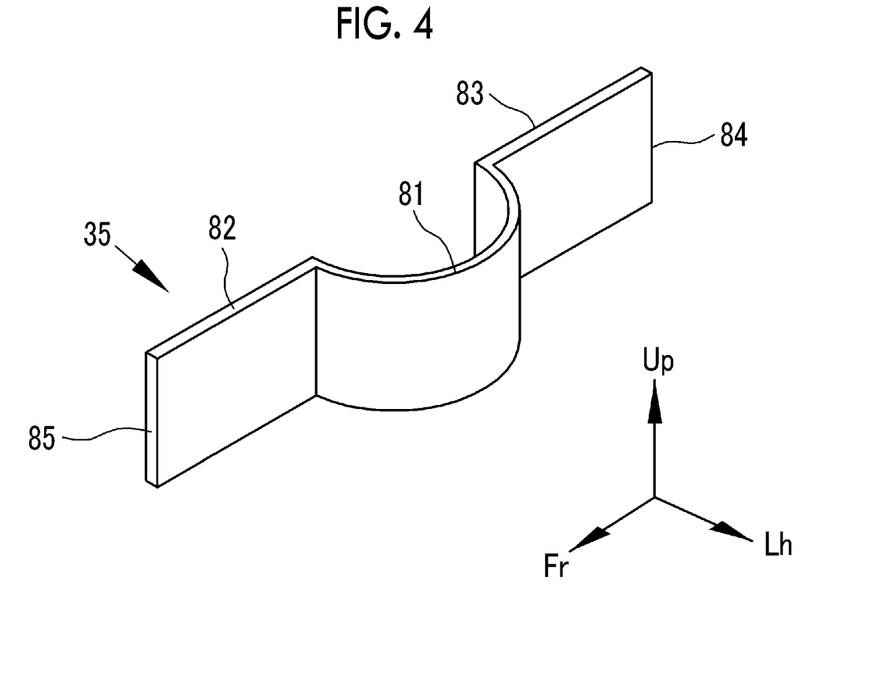
FIG. 4 is a perspective view showing a third elastic member.

FIG. 4 is a perspective view showing the third elastic member. As shown in FIG. 4, the third elastic member 35 has a characteristic in which it is more easily extended in the front-rear direction of the seat 10 than the first elastic member 30 and the second elastic member 31. As an example, the third elastic member 35 has a bent portion 81 at the center of the flat plate along the front-rear direction of the seat 10. That is, the third elastic member 35 has a shape having straight portions 82, 83 on both sides with the bent portion 81 interposed therebetween. The bent portion 81 may have, for example, an arc shape. One end 84 of the straight portion 83 is fixed to the first central portion 25 of the sub-frame 13, and one end 85 of the straight portion 82 is fixed to the second central portion 37 of the main frame 12. The bent portion 81 is provided in the third elastic member 35, whereby the cushioning properties for the waist portion can be provided at the time of taking a seat. The third elastic members 35 may be mounted at two or more positions in the width direction of the seat 10. In this case, the third elastic members 35 may be disposed at bilaterally symmetrical positions with respect to the center in the width direction of the seat 10. When a plurality of third elastic members 35 is disposed, the durability against the load acting in the front-rear direction of the seat 10 is improved. Further, when the third elastic member 35 that is located below the first elastic member 30 and the second elastic member 31 is made to have a characteristic in which it is more easily extended in the front-rear direction of the seat 10 than the first elastic member 30 and the second elastic member 31, the center for supporting the load that is applied in the front-rear direction of the seat 10 is located above the third elastic member 35 in the height direction of the seat 10. In this way, the center for supporting the load that is applied in the front-rear direction of the seat 10 can be made to be in the vicinity of the chest of the occupant, and thus the posture retainability of the occupant can be improved.

Figure 5:
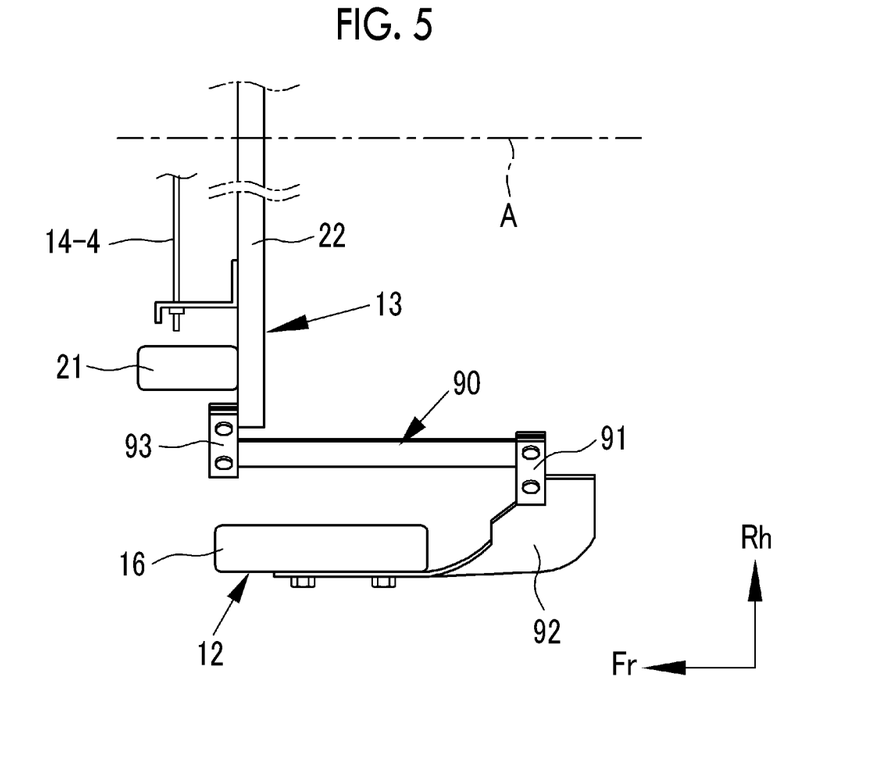
FIG. 5 is a plan view showing another embodiment of a mounting structure of the first elastic member.

FIG. 5 is a plan view showing another embodiment of the mounting structure of the first elastic member. In a first elastic member 90 in the embodiment shown in FIG. 5, a second end portion 91 on the rear side in the front-rear direction of the seat 10 is fixed to a fixing plate 92 extending rearward of the seat 10 from the main frame 12. A first end portion 93 on the front side in the front-rear direction of the seat 10, of the first elastic member 90, is fixed to the sub-frame 13. That is, in the embodiment shown in FIG. 5, the fixing plate 92 extending rearward of the seat 10 from the main frame 12 is used, and the second end portion 91 on the rear side in the front-rear direction of the seat 10, of the first elastic member 90, is mounted to the fixing plate 92. Even with such mounting, it is possible to receive tension in the front-rear direction of the seat 10 due to the load that is applied in the front-rear direction of the seat 10 when taking a seat.

The disclosure is not limited to the embodiments described above, and many modifications can be made by those skilled in the art within the technical idea of the disclosure. For example, the first elastic member 30 and the second elastic member 31 are not limited to those made of metal and may be made of, for example, a carbon material or the like. Further, the leaf spring is not limited to a flat plate shape and may have, for example, a corrugated shape or a zigzag shape.

What is claimed is:

1. A seat for a vehicle, the seat comprising:
   a seat back frame configured to support a back of a seated person, the seat back frame including (i) a main frame, (ii) a sub-frame that is disposed in front of the main frame in a front-rear direction of the seat, (iii) a connection tool disposed at a center of the seat back frame with respect to a width direction of the seat, and (iv) support members that are stretched and extend radially from a periphery of the connection tool and that suspend the sub-frame from the main frame, and
   a first elastic member and a second elastic member configured to support the sub-frame such that the sub-frame is rotatable in the width direction of the seat, the first elastic member and the second elastic member being mounted between the main frame and upper end portions of the sub-frame on both sides in the width direction of the seat,
   wherein each of the first elastic member and the second elastic member has a limit of elongation and has a characteristic in which a load that is applied to the sub-frame in a rear direction of the seat acts as tension to generate a reaction force due to the limit of elongation and does not generate the reaction force in the width direction of the seat.

2. The seat according to claim 1, wherein:
each of the first elastic member and the second elastic member is a leaf spring;
a first end portion of the first and second elastic members on a front side in the front-rear direction of the seat is fixed to a fixing plate extending forward or rearward in the front-rear direction of the seat from the main frame; and
a second end portion of the first and second elastic members on a rear side in the front-rear direction of the seat is fixed to the sub-frame.

3. The seat according to claim 1, wherein a first end portion on a front side of the first elastic member in the front-rear direction of the seat is fixed to a fixing plate extending forward or rearward in the front-rear direction of the seat from the main frame, and a second end portion on a rear side of the first elastic member in the front-rear direction of the seat is fixed to the sub-frame.

4. The seat according to claim 3, wherein a third end portion on a front side of the second elastic member in the front-rear direction of the seat is fixed to a fixing plate extending forward or rearward in the front-rear direction of the seat from the main frame, and a fourth end portion on a rear side of the second elastic member in the front-rear direction of the seat is fixed to the sub-frame.

5. The seat according to claim 1, wherein a second end portion on a rear side of the first elastic member in the front-rear direction of the seat is fixed to a fixing plate extending forward or rearward in the front-rear direction of the seat from the main frame, and a first end portion on a front side of the first elastic member in the front-rear direction of the seat is fixed to the sub-frame.

6. The seat according to claim 1, further comprising a third elastic member disposed between the main frame and a lower end portion of the sub-frame, the lower end portion being located further toward a lower side of the seat than the upper end portion,
wherein the third elastic member has a characteristic in which the third elastic member is more easily extended in the front-rear direction of the seat than the first elastic member and the second elastic member.

7. The seat according to claim 1, wherein the connection tool includes a plurality of guide portions provided in an interior of the connection tool, and each of the support members extends around a corresponding one of the plurality of guide portions.

* * * * *